United States Patent
Phillips et al.

(10) Patent No.: US 12,275,066 B2
(45) Date of Patent: Apr. 15, 2025

(54) SYSTEMS AND METHODS FOR IMPROVED MELTING IN THREE-DIMENSIONAL PRINTING PROCESSES

(71) Applicant: Nikon Corporation, Tokyo (JP)

(72) Inventors: Alton Hugh Phillips, Oro Valley, AZ (US); Eric Peter Goodwin, Oro Valley, AZ (US)

(73) Assignee: NIKON CORPORATION, Tokyo (JP)

( * ) Notice: Subject to any disclaimer, the term of this patent is extended or adjusted under 35 U.S.C. 154(b) by 591 days.

(21) Appl. No.: 17/494,660

(22) Filed: Oct. 5, 2021

(65) Prior Publication Data

US 2023/0106321 A1    Apr. 6, 2023

(51) Int. Cl.
| | |
|---|---|
| *B22F 12/41* | (2021.01) |
| *B22F 10/28* | (2021.01) |
| *B22F 10/70* | (2021.01) |
| *B22F 10/85* | (2021.01) |
| *B23K 26/06* | (2014.01) |
| *B23K 26/082* | (2014.01) |
| *B23K 26/34* | (2014.01) |

(Continued)

(52) U.S. Cl.
CPC .............. *B22F 12/41* (2021.01); *B22F 10/28* (2021.01); *B22F 10/70* (2021.01); *B23K 26/0643* (2013.01); *B23K 26/0821* (2015.10); *B23K 26/34* (2013.01); *B29C 64/00* (2017.08); *B29C 64/10* (2017.08); *B33Y 10/00* (2014.12); *B33Y 30/00* (2014.12); *B22F 10/85* (2021.01); *B33Y 50/02* (2014.12)

(58) Field of Classification Search
CPC .......... B22F 12/41; B22F 10/28; B22F 10/85; B22F 10/70; B23K 26/34; B33Y 10/00; B33Y 30/00; B33Y 50/02; B29C 64/00; B29C 64/10; B29C 64/357
USPC ..................................................... 219/121.66
See application file for complete search history.

(56) References Cited

U.S. PATENT DOCUMENTS

| | | | |
|---|---|---|---|
| 7,477,358 B2 * | 1/2009 | Phillips | G03F 7/70741 355/75 |
| 7,947,968 B1 * | 5/2011 | Markle | G03B 27/54 372/101 |

(Continued)

FOREIGN PATENT DOCUMENTS

| | | |
|---|---|---|
| CN | 104870652 A | 8/2015 |
| CN | 105849561 A | 8/2016 |

(Continued)

OTHER PUBLICATIONS

International Search Report (ISR) for PCT/US2022/045589, Jan. 30, 2022, pp. 1-5.

(Continued)

*Primary Examiner* — Thien S Tran
*Assistant Examiner* — Simpson A Chen (57) ABSTRACT

The problem of limited throughput in three-dimensional (3D) printing processes is addressed by systems and methods that employ mirrors to receive energy reflected by the melt pool and to redirect such light back to the melt pool, where it may further heat the melt pool. Multiple such passes of reflection from the melt pool and redirection back to the melt pool may substantially increase the efficiency at which the melt pool absorbs the energy, thereby substantially increasing the throughput of the 3D printing process.

14 Claims, 3 Drawing Sheets

(51) Int. Cl.
  *B29C 64/00* (2017.01)
  *B29C 64/10* (2017.01)
  *B33Y 10/00* (2015.01)
  *B33Y 30/00* (2015.01)
  *B33Y 50/02* (2015.01)

(56) References Cited

U.S. PATENT DOCUMENTS

| | | | |
|---|---|---|---|
| 2016/0160259 A1 | 6/2016 | Du | |
| 2016/0311157 A1* | 10/2016 | Van De Vrie | G02B 19/0095 |
| 2017/0072643 A1 | 3/2017 | Ng | |
| 2017/0304946 A1* | 10/2017 | Shibazaki | B22F 12/22 |
| 2017/0312856 A1* | 11/2017 | Chivel | C23C 4/00 |
| 2018/0029127 A1* | 2/2018 | Ng | G02B 26/0825 |
| 2018/0079004 A1* | 3/2018 | Herzog | B22F 10/00 |
| 2019/0265100 A1* | 8/2019 | Wagenblast | B33Y 10/00 |
| 2020/0001526 A1* | 1/2020 | Cooper | B29C 64/135 |
| 2020/0023583 A1* | 1/2020 | Hunze | B29C 64/277 |
| 2020/0108443 A1 | 4/2020 | Steeves | |
| 2021/0379665 A1 | 12/2021 | Tanigawa | |

FOREIGN PATENT DOCUMENTS

| | | |
|---|---|---|
| JP | 2021152219 A | 9/2021 |
| WO | 2005047981 A2 | 5/2005 |
| WO | 2016066237 A1 | 5/2016 |
| WO | 2020179114 A1 | 9/2020 |

OTHER PUBLICATIONS

Written Opinion Accompanying ISR for PCT/US2022/045589, Jan. 30, 2022, pp. 1-9.
English Translation of Abstract to WO2016066237, pp. 1-1.
English Translation of Description to WO2016066237, pp. 1-12.
English Translation of Claims to WO2016066237, pp. 1-3.
Chinese Search Report for Application No. 2017800854615, Dec. 2, 2022, pp. 1-2.
English Translation of Chinese Search Report for Application No. 2017800854615, Dec. 2, 2022, pp. 1-2.
Chinese Office Action for Application No. 2017800854615, Dec. 2, 2022, pp. 1-3.
English Translation of Chinese Office Action for Application No. 2017800854615, Dec. 2, 2022, pp. 1-4.

* cited by examiner

SYSTEMS AND METHODS FOR IMPROVED MELTING IN THREE-DIMENSIONAL PRINTING PROCESSES

BACKGROUND OF THE INVENTION

Certain three-dimensional (3D) printing systems and methods utilize directed energy (for instance, from a laser or an electron beam) to heat metal powders. By selectively heating different locations in successive layers of metal powders, a 3D printed metal part may be built layer by layer. These processes are often conducted in a vacuum or other gas-tight vessel. Such vessels are often formed from an optically opaque material such as stainless steel. As the heating process is performed, a pool of molten metal powder (a so-called "melt pool") forms at and near the location being heated. The melt pool may be highly reflective, causing much of the energy to be reflected away from the heat pool. This melt pool reflectivity may therefore result in limited optical absorption efficiencies and thus limit the rate at which 3D printed metal parts are formed by the 3D printing systems and methods (the so-called "throughput" of such systems and methods). Accordingly, presented herein are systems and methods for improved melting in 3D printing processes.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "or" shall convey both disjunctive and conjunctive meanings. For instance, the phrase "A or B" shall be interpreted to include element A alone, element B alone, and the combination of elements A and B.

Recent work in three-dimensional (3D) printing has allowed the production of additively manufactured metal parts having geometries that are difficult or impossible to manufacture using traditional subtractive manufacturing processes such as milling or lathing. Such 3D printed metal parts may have material properties (such as tensile strength, density, and the like) that are substantially similar to those of metal parts manufactured using the traditional subtractive manufacturing processes. Such 3D printing processes often utilize directed energy, such as laser light or an electron beam to selectively heat metal powders and thereby form layers of a metal part. These processes are often conducted in a vacuum or other gas-tight vessel. Such vessels are often formed from an optically opaque material such as stainless steel.

As the heating process is performed, a pool of molten metal powder (a so-called "melt pool") forms at and near the location being heated. The melt pool may be highly reflective, causing much of the energy to be reflected away from the heat pool. This melt pool reflectivity may therefore result in limited optical absorption efficiencies and thus limit the rate at which 3D printed metal parts are formed by the 3D printing systems and methods (the so-called "throughput" of such systems and methods).

Accordingly, the problem of limited throughput in 3D printing processes is addressed by systems and methods that employ mirrors to receive energy reflected by the melt pool and to redirect such light back to the melt pool, where it may further heat the melt pool. Multiple such passes of reflection from the melt pool and redirection back to the melt pool may substantially increase the efficiency at which the melt pool absorbs the energy, thereby substantially increasing the throughput of the 3D printing process.

A system for improved melting in a 3D printing process is disclosed herein. The system generally comprises: a container; a 3D printing platform located within the container and configured to support the production of a 3D printed component during a 3D printing process; an energy source configured to direct energy to the 3D printing platform (or to a production on the 3D printing platform) during the 3D printing process, thereby generating a melt pool on the 3D printing platform (or on the production); and a mirror configured to: (i) receive the energy reflected from the melt pool and (ii) reflect at least a portion of the energy reflected from the melt pool to the 3D printing platform (or to the production). In some embodiments, (ii) comprises reflecting the at least the portion to the melt pool. In some embodiments, (ii) comprises reflecting the at least the portion to a location near the melt pool. In some embodiments, the mirror comprises a spherical reflecting surface. In some embodiments, the spherical reflecting surface comprises a coating configured to reflect the at least the portion to the 3D printing platform (or to the production). In some embodiments, the coating is configured to transmit the energy other than the at least the portion. In some embodiments, the coating comprises an annular coating. In some embodiments, the energy is configured to heat the coating to a first temperature greater than a second temperature of materials near the coating, thereby thermophoretically pushing the materials away from the coating. In some embodiments, the mirror comprises a spherical non-reflecting surface. In some embodiments, the mirror comprises at least one hole configured to permit the energy to pass therethrough. In some embodiments, the mirror comprises at least one hole configured to permit one or more materials to pass therethrough. In some embodiments, the mirror comprises a plurality of mirror segments. In some embodiments, the plurality of mirror segments comprise a plurality of curvatures. In some embodiments, the plurality of mirror segments comprise a plurality of focal points. In some embodiments, the mirror comprises a deformable mirror. In some embodiments, the system further comprises a detector configured to detect a signal associated with the at least the portion and a controller configured to receive the signal and to deform the deformable mirror based upon the signal. In some embodiments, the system further comprises an optically transparent plate located between the mirror and the melt pool. In some embodiments, the energy source comprises an optical energy source and the energy comprises optical energy. In some embodiments, the optical energy source comprises a laser source and the optical energy comprises laser energy.

Further disclosed herein is a method for improved heating in a 3D printing process. The method generally comprises: (a) directing an energy source to direct energy to a 3D printing platform (or to a production on the 3D printing platform) contained within a container during a 3D printing process, thereby generating a melt pool on the 3D printing platform (or on the production); (b) using a mirror to receive the energy reflected from the melt pool; and (c) using the mirror to reflect at least a portion of the energy reflected from the melt pool to the 3D printing platform (or to the production).

The systems and methods described herein generally utilize one or more mirrors to receive energy reflected by the melt pool and to redirect such light back to the melt pool, where it may further heat the melt pool. Multiple such passes of reflection from the melt pool and redirection back to the melt pool may substantially increase the efficiency at which the melt pool absorbs the energy, thereby substantially increasing the throughput of the 3D printing process.

Figure 1:
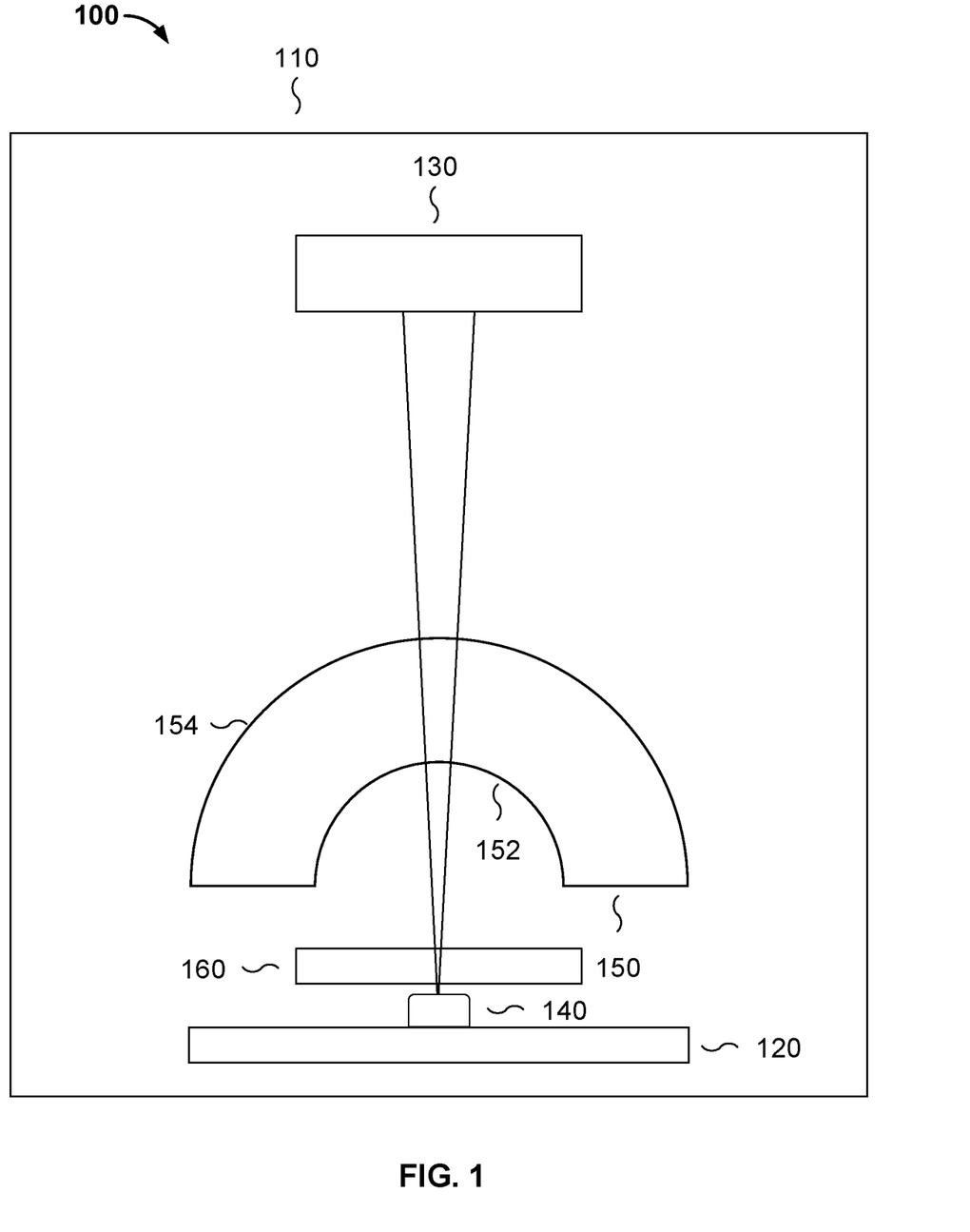
FIG. 1 shows a schematic depicting a first exemplary system for improved melting in a three-dimensional (3D) printing process.

FIG. 1 shows a schematic depicting a first exemplary system 100 for improved heating in a 3D printing process. In the example shown, the system comprises a container 110. In some embodiments, the closed container comprises a gas-tight container. In some embodiments, the closed container comprises a pressure container. In some embodiments, the closed container comprises a vacuum container. In some embodiments, the closed container comprises a high vacuum container. In some embodiments, the closed container comprises an ultra-high vacuum container.

In the example shown, the system comprises a 3D printing platform 120 located within the container. In some embodiments, the 3D printing platform is configured to support the production of a 3D printed component or production during a 3D printing process. In some embodiments, the 3D printing process comprises a metal bed fusion process, a direct metal laser sintering process, or a selective laser melting process. In some embodiments, the 3D printing platform comprises a 3D printing melt platform.

In the example shown, the system comprises an energy source 130. In some embodiments, the energy source is located within the container. In some embodiments, the energy source is external to the container. In some embodiments, the energy source is configured to direct energy to the 3D printing platform (or to the production) during the 3D printing process, thereby generating a melt pool 140 on the 3D printing platform (or on the production). In some embodiments, the energy source comprises a laser. In some embodiments, the energy selectively heats different portions of a layer of metal powder located on the 3D printing platform (or on the production).

In some embodiments, the energy source comprises an optical energy source and the energy comprises optical energy. In some embodiments, the optical energy source comprises a laser energy source and the optical energy comprises laser energy. In some embodiments, the laser source is configured to emit continuous wave laser energy. In some embodiments, the laser source is configured to emit pulsed laser energy.

In the example shown, the system comprises at least one mirror 150 located within the container. In some embodiments, the at least one mirror is in optical communication with the 3D printing platform. In some embodiments, the mirror is configured to: (i) receive the energy reflected from the melt pool and (ii) reflect at least a portion of the energy reflected from the melt pool to the 3D printing platform (or to the production). In some embodiments, (ii) comprises reflecting the portion to the melt pool. In some embodiments, reflecting the portion to the melt pool further increases the temperature of the melt pool, increasing a rate of heating of the melt pool and thereby increasing throughput. In some embodiments, (ii) comprises reflecting the portion to a location near the melt pool. In some embodiments, (ii) comprises reflecting the portion to a location ahead of, behind, above, or below the melt pool. In some embodiments, reflecting the portion to a location near the melt pool increases the temperature of powder near the melt pool, thereby reducing a temperature gradient between the melt pool and powder located near the melt pool. In some embodiments, the reducing in the temperature gradient improves the 3D print quality by preheating or annealing the 3D printed component, increasing a rate of heating of the 3D printed component and thereby increasing throughput.

In some embodiments, the mirror comprises a reflecting surface 152. In some embodiments, the reflecting surface is a spherical reflecting surface. In some embodiments, the mirror comprises a non-reflecting surface 154. In some embodiments, the non-reflecting surface is a spherical non-reflecting surface. In some embodiments, the spherical non-reflecting surface permits energy emitted by the energy source to pass through the mirror and toward the 3D printing platform (or toward the production) without substantial optical aberrations. In some embodiments, the non-reflecting surface is not coated with a reflective coating. In some embodiments, the non-reflecting surface is a back surface of the mirror.

Although depicted as comprising a spherical mirror, spherical reflecting surface, and spherical non-reflecting surface in FIG. 1, the mirror, the reflecting surface, or the non-reflecting surface may be any shape. For example, the mirror, the reflecting surface, or the non-reflecting surface may be configured in a fan shape. The fan shape may subtend an angle of at least about 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, 175 degrees, 180 degrees, or more. The fan shape may subtend an angle of at most about 180 degrees, 175 degrees, 170 degrees, 165 degrees, 160 degrees, 155 degrees, 150 degrees, 145 degrees, 140 degrees, 135 degrees, 130 degrees, 125 degrees, 120 degrees, 115 degrees, 110 degrees, 105 degrees, 100 degrees, 95 degrees, 90 degrees, 85 degrees, 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees, 10 degrees, 5 degrees, or less. The fan shape may subtend an angle that is within a range defined by any two of the preceding values.

In some embodiments, the reflecting surface comprises a coating configured to reflect the portion to the 3D printing platform. In some embodiments, the coating comprises aluminum, gold, dichroic gold, silver, dichroic silver, chrome, copper, Inconel, nickel, titanium, or any combination or alloy thereof. In some embodiments, coating comprises one or more dielectric layers. In some embodiments, the coating comprises one or more layers comprising an oxide of silicon, titanium, tantalum, zirconium, hafnium, scandium, niobium, or any combination or alloy thereof.

In some embodiments, the coating is wavelength selective. In some embodiments, the coating is configured to reflect only the portion to the 3D printing platform (or to the production). In some embodiments, the portion comprises a subset of wavelengths of the energy. In some embodiments, the portion comprises a subset of wavelengths of the energy that are intended to further heat the melt pool. In some embodiments, the coating is configured to transmit energy other than the portions. In this manner, wavelengths other than those intended to further heat the melt pool may be used to characterize the 3D printing process. For instance, the wavelengths other than those intended to further heat the melt pool may be used to characterize the 3D printing process by pyrometry, spectroscopy, or spectrometry. In some embodiments, the wavelengths comprise wavelengths associated with blackbody radiation emitted by the melt pool. In some embodiments, the wavelengths comprise wavelengths associated with the coating, such as wavelengths associated with aluminum, gold, dichroic gold, silver, dichroic silver, chrome, copper, Inconel, nickel, titanium, or any combination or alloy thereof.

In some embodiments, the coating is configured to have a maximum reflectance at a wavelength of at least about 200 nanometers (nm), 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1 micrometer (µm), 1.05 µm, 1.1 µm, 1.15 µm, 1.2 µm, 1.25 µm, 1.3 µm, 1.35 µm, 1.4 µm, 1.45 µm, 1.5 µm, 1.55 µm, 1.6 µm, 1.65 µm, 1.7 µm, 1.75 µm, 1.8 µm, 1.85 µm, 1.9 µm, 1.95 µm, 2 µm, 2.05 µm, 2.1 µm, 2.15 µm, 2.25 µm, 2.25 µm, 2.3 µm, 2.35 µm, 2.4 µm, 2.45 µm, 2.5 µm, 2.55 µm, 2.6 µm, 2.65 µm, 2.7 µm, 2.75 µm, 2.8 µm, 2.85 µm, 2.9 µm, 2.95 µm, 3 µm, 3.05 µm, 3.1 µm, 3.15 µm, 3.2 µm, 3.25 µm, 3.3 µm, 3.35 µm, 3.4 µm, 3.45 µm, 3.5 µm, 3.55 µm, 3.6 µm, 3.65 µm, 3.7 µm, 3.75 µm, 3.8 µm, 3.85 µm, 3.9 µm, 3.95 µm, 4 µm, 4.05 µm, 4.1 µm, 4.15 µm, 4.2 µm, 4.25 µm, 4.3 µm, 4.35 µm, 4.4 µm, 4.45 µm, 4.5 µm, 4.55 µm, 4.6 µm, 4.65 µm, 4.7 µm, 4.75 µm, 4.8 µm, 4.85 µm, 4.9 µm, 4.95 µm, 5 µm, 5.05 µm, 5.1 µm, 5.15 µm, 5.2 µm, 5.25 µm, 5.3 µm, 5.35 µm, 5.4 µm, 5.45 µm, 5.5 µm, 5.55 µm, 5.6 µm, 5.65 µm, 5.7 µm, 5.75 µm, 5.8 µm, 5.85 µm, 5.9 µm, 5.95 µm, 6 µm, 6.05 µm, 6.1 µm, 6.15 µm, 6.2 µm, 6.25 µm, 6.3 µm, 6.35 µm, 6.4 µm, 6.45 µm, 6.5 µm, 6.55 µm, 6.6 µm, 6.65 µm, 6.7 µm, 6.75 µm, 6.8 µm, 6.85 µm, 6.9 µm, 6.95 µm, 7 µm, 7.05 µm, 7.1 µm, 7.15 µm, 7.2 µm, 7.25 µm, 7.3 µm, 7.35 µm, 7.4 µm, 7.45 µm, 7.5 µm, 7.55 µm, 7.6 µm, 7.65 µm, 7.7 µm, 7.75 µm, 7.8 µm, 7.85 µm, 7.9 µm, 7.95 µm, 8 µm, 8.05 µm, 8.1 µm, 8.15 µm, 8.2 µm, 8.25 µm, 8.3 µm, 8.35 µm, 8.4 µm, 8.45 µm, 8.5 µm, 8.55 µm, 8.6 µm, 8.65 µm, 8.7 µm, 8.75 µm, 8.8 µm, 8.85 µm, 8.9 µm, 8.95 µm, 9 µm, 9.05 µm, 9.1 µm, 9.15 µm, 9.2 µm, 9.25 µm, 9.3 µm, 9.35 µm, 9.4 µm, 9.45 µm, 9.5 µm, 9.55 µm, 9.6 µm, 9.65 µm, 9.7 µm, 9.75 µm, 9.8 µm, 9.85 µm, 9,9 µm, 9.95 µm, 10 µm, or more. In some embodiments, the coating is configured to have a maximum reflectance at a wavelength of at most about 10 µm, 9.95 µm, 9.9 µm, 9.85 µm, 9.8 µm, 9.75 µm, 9.7 µm, 9.65 µm, 9.6 µm, 9.55 µm, 9.5 µm, 9.45 µm, 9.4 µm, 9.35 µm, 9.3 µm, 9.25 µm, 9.2 µm, 9.15 µm, 9.1 µm, 9.05 µm, 9 µm, 8.95 µm, 8.9 µm, 8.85 µm, 8.8 µm, 8.75 µm, 8.7 µm, 8.65 µm, 8.6 µm, 8.55 µm, 8.5 µm, 8.45 µm, 8.4 µm, 8.35 µm, 8.3 µm, 8.25 µm, 8.2 µm, 8.15 µm, 8.1 µm, 8.05 µm, 8 µm, 7.95 µm, 7.9 µm, 7.85 µm, 7.8 µm, 7.75 µm, 7.7 µm, 7.65 µm, 7.6 µm, 7.55 µm, 7.5 µm, 7.45 µm, 7.4 µm, 7.35 µm, 7.3 µm, 7.25 µm, 7.2 µm, 7.15 µm, 7.1 µm, 7.05 µm, 7 µm, 6.95 µm, 6.9 µm, 6.85 µm, 6.8 µm, 6.75 µm, 6.7 µm, 6.65 µm, 6.6 µm, 6.55 µm, 6.5 µm, 6.45 µm, 6.4 µm, 6.35 µm, 6.3 µm, 6.25 µm, 6.2 µm, 6.15 µm, 6.1 µm, 6.05 µm, 6 µm, 5.95 µm, 5.9 µm, 5.85 µm, 5.8 µm, 5.75 µm, 5.7 µm, 5.65 µm, 5.6 µm, 5.55 µm, 5.5 µm, 5.45 µm, 5.4 µm, 5.35 µm, 5.3 µm, 5.25 µm, 5.2 µm, 5.15 µm, 5.1 µm, 5.05 µm, 5 µm, 4.95 µm, 4.9 µm, 4.85 µm, 4.8 µm, 4.75 µm, 4.7 µm, 4.65 µm, 4.6 µm, 4.55 µm, 4.5 µm, 4.45 µm, 4.4 µm, 4.35 µm, 4.3 µm, 4.25 µm, 4.2 µm, 4.15 µm, 4.1 µm, 4.05 µm, 4 µm, 3.95 µm, 3.9 µm, 3.85 µm, 3.8 µm, 3.75 µm, 3.7 µm, 3.65 µm, 3.6 µm, 3.55 µm, 3.5 µm, 3.45 µm, 3.4 µm, 3.35 µm, 3.3 µm, 3.25 µm, 3.2 µm, 3.15 µm, 3.1 µm, 3.05 µm, 3 µm, 2.95 µm, 2.9 µm, 2.85 µm, 2.8 µm, 2.75 µm, 2.7 µm, 2.65 µm, 2.6 µm, 2.55 µm, 2.5 µm, 2.45 µm, 2.4 µm, 2.35 µm, 2.3 µm, 2.25 µm, 2.2 µm, 2.15 µm, 2.1 µm, 2.05 µm, 2 µm, 1.95 µm, 1.9 µm, 1.85 µm, 1.8 µm, 1.75 µm, 1.7 µm, 1.65 µm, 1.6 µm, 1.55 µm, 1.5 µm, 1.45 µm, 1.4 µm, 1.35 µm, 1.3 µm, 1.25 µm, 1.2 µm, 1.15 µm, 1.1 µm, 1.05 µm, 1 µm, 950 nm, 900 nm, 850 nm, 800 nm, 750 nm, 700 nm, 650 nm, 600 nm, 550 nm, 500 nm, 450 nm, 400 nm, 350 nm, 300 nm, 250 nm, 200 nm, or less. In some embodiments, the coating is configured to have a maximum reflectance at a wavelength that is within a range defined by any two of the preceding values.

In some embodiments, the coating comprises an annular coating. In some embodiments, the annular coating comprises an annular shape. In some embodiments, the annular coating comprises at least one annular hole (not shown in FIG. 1). In some embodiments, the at least one annular hole permits energy emitted by the energy source to pass through the mirror and toward the 3D printing platform (or toward the production) without reflecting from the coating and back toward the energy source.

In some embodiments, the energy is configured to heat the coating to a first temperature greater than a second temperature of materials near the coating, thereby thermophoretically pushing the materials away from the coating. In some embodiments, such a configuration utilizes the thermophoretic effect to drive materials away from the coating, thereby reducing contamination of the coating by the materials. In some embodiments, the materials comprise fumes, gases, smoke, powder, or other materials that are directed toward the coating during the 3D printing process.

In some embodiments, the mirror comprises at least one first hole (not shown in FIG. 1). In some embodiments, the at least one first hole is drilled, cut, or etched through the mirror. In some embodiments, the at least one first hole is configured to permit the energy to pass therethrough. In some embodiments, the at least one first hole permits energy emitted by the energy source to pass through the mirror and toward the 3D printing platform (or toward the production) without reflecting from the coating and back toward the energy source.

In some embodiments, the mirror comprises at least one second hole (not shown in FIG. 1). In some embodiments, the at least one second hole is drilled, cut, or etched through the mirror. In some embodiments, the at least one second hole comprises at least about 1, 2, 3, 4, 5, 6, 7, 8, 9, 10, 20, 30, 40, 50, 60, 70, 80, 90, 100, or more holes. In some embodiments, the at least one second hole comprises at most about 100, 90, 80, 70, 60, 50, 40, 30, 20, 10, 9, 8, 7, 6, 5, 4, 3, 2, or 1 holes. In some embodiments, the at least one second hole comprises a number of holes that is within a range defined by any two of the preceding values. In some embodiments, the at least one second hole is configured to permit one or more materials to pass therethrough. In some embodiments, such a configuration reduces contamination of the coating by the materials. In some embodiments, such a configuration reduces attenuation of the energy or the reflected energy by removing the materials from the optical path. In some embodiments, the materials comprise fumes, gases, smoke, powder, or other materials that are directed toward the mirror or coating during the 3D printing process.

In some embodiments, the system comprises both at least one first hole and at least one second hole. In some embodiments, the system comprises at least one first hole but does not comprise a second hole. In some embodiments, the system comprises at least one second hole but does not comprise a second hole. In some embodiments, the system comprises neither a first hole nor a second hole.

In some embodiments, the mirror comprises a plurality of mirror segments (not shown in FIG. 1). In some embodiments, the mirror comprises at least about 1, 2, 3, 4, 5, 6, 7, 8, 9, 10, 20, 30, 40, 50, 60, 70, 80, 90, 100, or more mirror segments. In some embodiments, the mirror comprises at most about 100, 90, 80, 70, 60, 50, 40, 30, 20, 10, 9, 8, 7, 6, 5, 4, 3, 2, or 1 mirror segments. In some embodiments, the mirror comprises a number of mirror segments that is within a range defined by any two of the preceding values. In some embodiments, the plurality of mirror segments In some embodiments, the plurality of mirror segments comprise a plurality of curvatures. In some embodiments, each mirror segment of the plurality has a similar radius of curvature. In some embodiments, one or more mirror segments of the plurality has a different radius of curvature from other mirror segments of the plurality. In some embodiments, each mirror segment of the plurality has a different radius of curvature from all other mirror segments of the plurality. In some embodiments, each mirror segment of the plurality has a similar radius of curvature. In some embodiments, one or more mirror segments of the plurality has a different radius of curvature from other mirror segments of the plurality. In some embodiments, each mirror segment of the plurality has a different radius of curvature from all other mirror segments of the plurality. By varying the radius of curvature, various portions of the energy reflected by the melt pool and redirected to the 3D printing platform (or to the production) may be delivered different locations on the 3D printing platform (or on the production). For example, portions of the energy may be delivered to the melt pool, ahead of the melt pool, behind the melt pool, above the melt pool, and below the melt pool to achieve the reduced temperature gradient described herein.

In some embodiments, the plurality of mirror segments comprise a plurality of focal points. In some embodiments, each mirror segment of the plurality has a similar focal point. In some embodiments, one or more mirror segments of the plurality has a different focal point from other mirror segments of the plurality. In some embodiments, each mirror segment of the plurality has a different focal point from all other mirror segments of the plurality. In some embodiments, each mirror segment of the plurality has a similar focal point. In some embodiments, one or more mirror segments of the plurality has a different focal point from other mirror segments of the plurality. In some embodiments, each mirror segment of the plurality has a different focal point from all other mirror segments of the plurality. By varying the focal point, various portions of the energy reflected by the melt pool and redirected to the 3D printing platform (or to the production) may be delivered to different locations on the 3D printing platform (or on the production). For example, portions of the energy may be delivered to the melt pool, ahead of the melt pool, behind the melt pool, above the melt pool, and below the melt pool to achieve the reduced temperature gradient described herein.

In some embodiments, the mirror comprises a deformable mirror. In some embodiments, the system comprises a detector (not shown in FIG. 1) and a controller (not shown in FIG. 1). In some embodiments, the detector is configured to detect a signal associated with the portion of energy. In some embodiments, the controller is configured to receive the signal and to deform the deformable mirror based upon the signal.

In some embodiments, the mirror is configured to be dynamically pointed at different locations on the 3D printing platform (or on the production). In some embodiments, the mirror is configured to be dynamically pointed in response to the geometry of a part being formed on the 3D printing platform.

In some embodiments, the system further comprises at least one optically transparent plate 160. In some embodiments, the at least one optically transparent plate is located between the mirror and the melt pool. In some embodiments, such a configuration reduces contamination of the coating by the materials. In some embodiments, the materials comprise fumes, gases, smoke, powder, or other materials that are directed toward the mirror or coating during the 3D printing process. In some embodiments, the energy is configured to heat the at least one optically transparent plate to a first temperature greater than a second temperature of materials near the optically transparent plate, thereby thermophoretically pushing the materials away from the optically transparent plate. In some embodiments, such a configuration utilizes the thermophoretic effect to drive materials away from the optically transparent plate, thereby reducing contamination of the coating by the materials. In some embodiments, the materials comprise fumes, gases, smoke, powder, or other materials that are directed toward the optically transparent plate during the 3D printing process.

Although depicted as comprising an optically transparent plate in FIG. 1, the system need not comprise an optically transparent plate.

Figure 2:
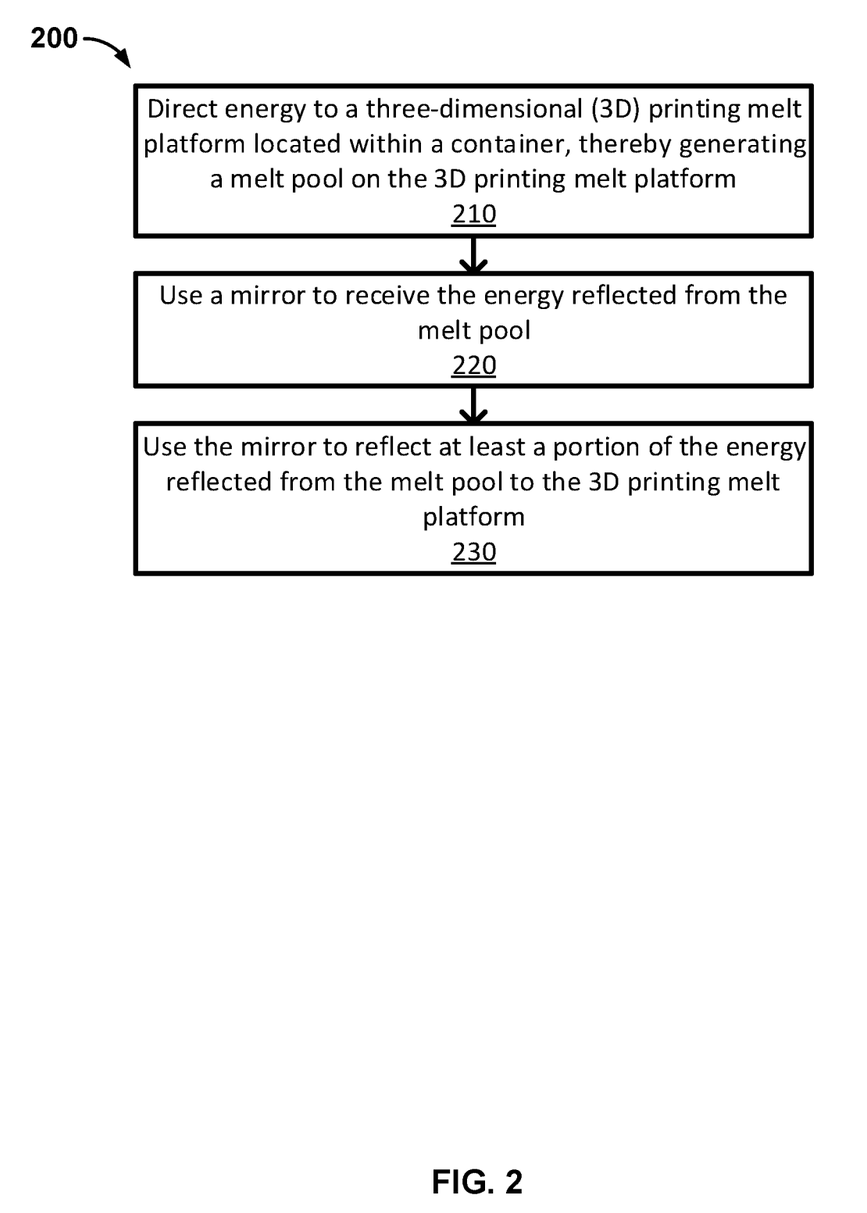
FIG. 2 shows a flowchart depicting an exemplary method for improved heating in a 3D printing process.

FIG. 2 shows a flowchart depicting an exemplary method 200 for improved heating in a 3D printing process. In the example shown, an energy source is directed to direct energy to a 3D printing platform (or to a production on the 3D printing platform) located within a container at 210. The energy thereby generates a melt pool on the 3D printing platform (or on the production), as described herein with respect to FIG. 1.

At 220, a mirror is used to receive the energy reflected from the melt pool, as described herein with respect to FIG. 1.

At 230, the mirror is used to reflect at least a portion of the energy reflected from the melt pool to the 3D printing platform (or to the production), as described herein with respect to FIG. 1.

The method 200 may be implemented using any of the systems described herein, such as system 100 described herein with respect to FIG. 1.

Additionally, systems are disclosed that can be used to perform the method 200 of FIG. 2, or any of operations 210, 220, and 230. In some embodiments, the systems comprise one or more processors and memory coupled to the one or more processors. In some embodiments, the one or more processors are configured to implement one or more operations of method 200. In some embodiments, the memory is configured to provide the one or more processors with instructions corresponding to the operations of method 200. In some embodiments, the instructions are embodied in a tangible computer readable storage medium.

Figure 3:
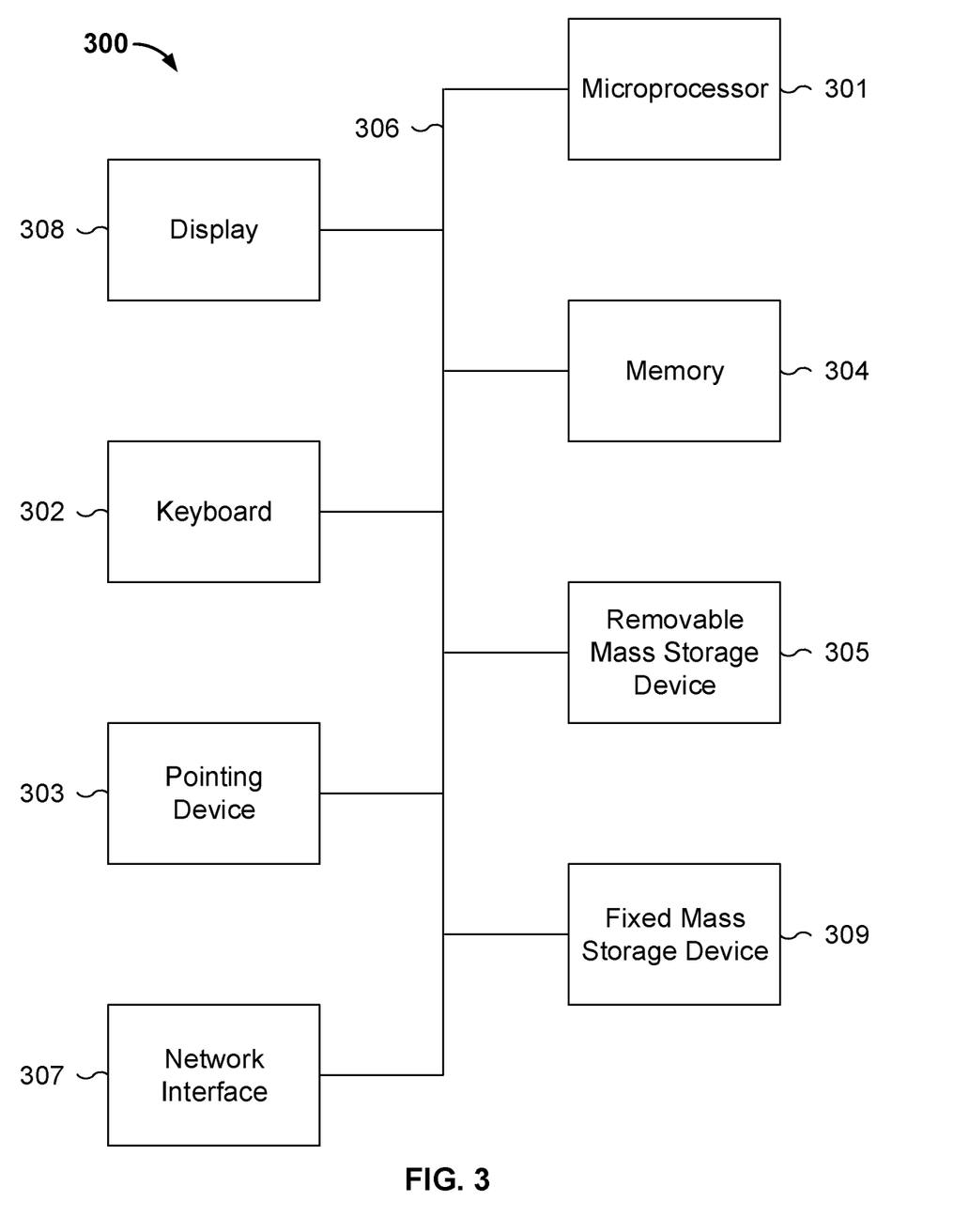
FIG. 3 shows a block diagram of a computer system for improved heating in a 3D printing process.

FIG. 3 is a block diagram of a computer system 300 used in some embodiments to perform portions of methods for improved heating in a 3D printing process described herein (such as operation 210, 220, or 230 of method 200 as described herein with respect to FIG. 2). In some embodiments, the computer system may be utilized as a component in systems for observation of a 3D printing process described herein. FIG. 3 illustrates one embodiment of a general purpose computer system. Other computer system architectures and configurations can be used for carrying out the processing of the present invention. Computer system 300, made up of various subsystems described below, includes at least one microprocessor subsystem 301. In some embodiments, the microprocessor subsystem comprises at least one central processing unit (CPU) or graphical processing unit (GPU). The microprocessor subsystem can be implemented by a single-chip processor or by multiple processors. In some embodiments, the microprocessor subsystem is a general purpose digital processor which controls the operation of the computer system 300. Using instructions retrieved from memory 304, the microprocessor subsystem controls the reception and manipulation of input data, and the output and display of data on output devices.

The microprocessor subsystem 301 is coupled bi-directionally with memory 304, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on microprocessor subsystem. Also as well known in the art, primary storage typically includes basic operating instructions, program code, data and objects used by the microprocessor subsystem to perform its functions. Primary storage devices 304 may include any suitable computer-readable storage media, described below, depending on whether, for example, data access needs to be bi-directional or uni-directional. The microprocessor subsystem 301 can also directly and very rapidly retrieve and store frequently needed data in a cache memory (not shown).

A removable mass storage device 305 provides additional data storage capacity for the computer system 300, and is coupled either bi-directionally (read/write) or uni-directionally (read only) to microprocessor subsystem 301. Storage 305 may also include computer-readable media such as magnetic tape, flash memory, signals embodied on a carrier wave, PC-CARDS, portable mass storage devices, holographic storage devices, and other storage devices. A fixed mass storage 309 can also provide additional data storage capacity. The most common example of mass storage 309 is a hard disk drive. Mass storage 305 and 309 generally store additional programming instructions, data, and the like that typically are not in active use by the processing subsystem. It will be appreciated that the information retained within mass storage 305 and 309 may be incorporated, if needed, in standard fashion as part of primary storage 304 (e.g. RAM) as virtual memory.

In addition to providing processing subsystem 301 access to storage subsystems, bus 306 can be used to provide access other subsystems and devices as well. In the described embodiment, these can include a display monitor 308, a network interface 307, a keyboard 302, and a pointing device 303, as well as an auxiliary input/output device interface, a sound card, speakers, and other subsystems as needed. The pointing device 303 may be a mouse, stylus, track ball, or tablet, and is useful for interacting with a graphical user interface.

The network interface 307 allows the processing subsystem 301 to be coupled to another computer, computer network, or telecommunications network using a network connection as shown. Through the network interface 307, it is contemplated that the processing subsystem 301 might receive information, e.g., data objects or program instructions, from another network, or might output information to another network in the course of performing the above-described method steps. Information, often represented as a sequence of instructions to be executed on a processing subsystem, may be received from and outputted to another network, for example, in the form of a computer data signal embodied in a carrier wave. An interface card or similar device and appropriate software implemented by processing subsystem 301 can be used to connect the computer system 300 to an external network and transfer data according to standard protocols. That is, method embodiments of the present invention may execute solely upon processing subsystem 301, or may be performed across a network such as the Internet, intranet networks, or local area networks, in conjunction with a remote processing subsystem that shares a portion of the processing. Additional mass storage devices (not shown) may also be connected to processing subsystem 301 through network interface 307.

An auxiliary I/O device interface (not shown) can be used in conjunction with computer system 300. The auxiliary I/O device interface can include general and customized interfaces that allow the processing subsystem 301 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter. The computer system shown in FIG. 3 is but an example of a computer system suitable for use with the invention. Other computer systems suitable for use with the invention may include additional or fewer subsystems. In addition, bus 306 is illustrative of any interconnection scheme serving to link the subsystems. Other computer architectures having different configurations of subsystems may also be utilized.

EXAMPLES

Example 1: Calculated Reflection Efficiency

The multi-pass reflection efficiency of a system for improved melting in a 3D printing process described herein was calculated. A melt pool reflectivity of 85% and a mirror reflectivity of 95% were assumed. Moreover, the mirror was assumed to interact with 70% of the light reflected from the melt pool. The efficiency was calculated iteratively by calculating the amount of light reflected by the mirror and returned to the melt pool for five reflective passes. The calculations were as follows:

Melt pool 1st pass: 15% absorbed, 85% reflected
Mirror 1st pass: 0.85*0.67=57% reflected
Melt pool 2nd pass: 0.57*0.15=8.5% absorbed, 48.5% reflected
Mirror 2nd pass: 0.485*0.67=32% reflected
Melt pool 3rd pass: 0.32*0.15=4.8% absorbed, 27.2% reflected
Mirror 3rd pass: 0.272*0.67=18% reflected
Melt pool 4th pass: 0.18*0.15=2.7% absorbed, 15.3% reflected
Mirror 4th pass: 0.153*0.67=10% reflected
Melt pool 5th pass: 0.1*0.15=1.5% absorbed, 8.5% reflected
Total melt pool absorption: 15%+8.5%+4.8%+2.7%+1.5%=32.5%

Thus, in comparison to an exemplary single-pass melt pool absorption of 15%, the systems and methods of the present disclosure can be expected to achieve an exemplary absorption of greater than 32.5%. The systems and methods of the present disclosure can thus be expected to increase throughput in 3D printing processes.

Recitation Of Embodiments

Embodiment 1. A system comprising:
a container;
a three-dimensional (3D) printing platform located within the container and configured to support the production of a 3D printed component during a 3D printing process;
an energy source configured to direct energy to the 3D printing platform (or a production on the 3D printing platform) during the 3D printing process, thereby generating a melt pool on the 3D printing platform (or on the production); and
a mirror configured to: (i) receive the energy reflected from the melt pool and (ii) reflect at least a portion of the energy reflected from the melt pool to the 3D printing platform (or to the production).

Embodiment 2. The system of Embodiment 1, wherein (ii) comprises reflecting the at least the portion to the melt pool.

Embodiment 3. The system of Embodiment 1, wherein (ii) comprises reflecting the at least the portion to a location near the melt pool.

Embodiment 4. The system of any one of Embodiments 1-3, wherein the mirror comprises a spherical reflecting surface.

Embodiment 5. The system of Embodiment 4, wherein the spherical reflecting surface comprises a coating configured to reflect the at least the portion to the 3D printing platform (or to the production).

Embodiment 6. The system of Embodiment 5, wherein the coating is configured to transmit the energy other than the at least the portion.

Embodiment 7. The system of Embodiment 5 or 6, wherein the coating comprises an annular coating.

Embodiment 8. The system of any one of Embodiments 5-7, wherein the energy is configured to heat the coating to a first temperature greater than a second temperature of materials near the coating, thereby thermophoretically pushing the materials away from the coating.

Embodiment 9. The system of any one of Embodiments 1-8, wherein the mirror comprises a spherical non-reflecting surface.

Embodiment 10. The system of any one of Embodiments 1-9, wherein the mirror comprises at least one hole configured to permit the energy to pass therethrough.

Embodiment 11. The system of any one of Embodiments 1-10, wherein the mirror comprises at least one hole configured to permit one or more materials to pass therethrough.

Embodiment 12. The system of any one of Embodiments 1-11, wherein the mirror comprises a plurality of mirror segments.

Embodiment 13. The system of Embodiment 12, wherein the plurality of mirror segments comprise a plurality of curvatures.

Embodiment 14. The system of Embodiment 12, wherein the plurality of mirror segments comprise a plurality of focal points.

Embodiment 15. The system of any one of Embodiments 1-14, wherein the mirror comprises a deformable mirror.

Embodiment 16. The system of Embodiment 15, further comprising a detector configured to detect a signal associated with the at least the portion and a controller configured to receive the signal and to deform the deformable mirror based upon the signal.

Embodiment 17. The system of any one of Embodiments 1-16, further comprising an optically transparent plate located between the mirror and the melt pool.

Embodiment 18. The system of any one of Embodiments 1-17, wherein the energy source comprises an optical energy source and the energy comprises optical energy.

Embodiment 19. The system of Embodiment 18, wherein the optical energy source comprises a laser source and the optical energy comprises laser energy.

Embodiment 20. A method comprising:
(a) directing an energy source to direct energy to a 3D printing platform (or to a production on the 3D printing platform) contained within a container during a 3D printing process, thereby generating a melt pool on the 3D printing platform (or on the production);
(b) using a mirror to receive the energy reflected from the melt pool; and.
(c) using the mirror to reflect at least a portion of the energy reflected from the melt pool to the 3D printing platform (or to the production).

Embodiment 21. The method of Embodiment 20, wherein (c) comprises reflecting the at least the portion to the melt pool.

Embodiment 22. The method of Embodiment 20, wherein (c) comprises reflecting the at least the portion to a location near the melt pool.

Embodiment 23. The method of any one of Embodiments 20-22, wherein the mirror comprises a spherical reflecting surface.

Embodiment 24. The method of Embodiment 23, wherein the spherical reflecting surface comprises a coating configured to reflect the at least the portion to the 3D printing platform (or to the production).

Embodiment 25. The method of Embodiment 24, wherein the coating is configured to transmit the energy other than the at least the portion.

Embodiment 26. The method of Embodiment 24 or 25, wherein the coating comprises an annular coating.

Embodiment 27. The method of any one of Embodiments 24-26, wherein the energy is configured to heat the coating to a first temperature greater than a second temperature of materials near the coating, thereby thermophoretically pushing the materials away from the coating.

Embodiment 28. The method of any one of Embodiments 20-27, wherein the mirror comprises a spherical non-reflecting surface.

Embodiment 29. The method of any one of Embodiments 20-28, wherein the mirror comprises at least one hole configured to permit the energy to pass therethrough.

Embodiment 30. The method of any one of Embodiments 20-29, wherein the mirror comprises at least one hole configured to permit one or more materials to pass therethrough.

Embodiment 31. The method of any one of Embodiments 20-30, wherein the mirror comprises a plurality of mirror segments.

Embodiment 32. The method of Embodiment 31, wherein the plurality of mirror segments comprise a plurality of curvatures.

Embodiment 33. The method of Embodiment 31, wherein the plurality of mirror segments comprise a plurality of focal points.

Embodiment 34. The method of any one of Embodiments 20-33, wherein the mirror comprises a deformable mirror.

Embodiment 35. The method of Embodiment 34, further comprising detecting a signal associated with the at least the portion and deforming the deformable mirror based upon the signal.

Embodiment 37. The method of any one of Embodiments 20-36, wherein the energy comprises optical energy.

Embodiment 38. The method of Embodiment 37, wherein the optical energy comprises laser energy.

The invention claimed is:

1. A system comprising:
a three-dimensional (3D) printing platform configured to form a 3D printed component;
an energy source configured to direct energy to the 3D printing platform to thereby generate a melt pool on the 3D printing platform; and
a mirror comprising a spherical reflecting surface and a hole,
wherein the spherical reflecting surface is convex toward an upstream side of the energy and configured to transmit the energy, and
wherein the mirror is configured to:
(i) pass the energy via the hole,
(ii) receive the energy reflected from the melt pool, and
(iii) reflect at least a portion of the energy reflected from the melt pool to the 3D printing platform.

2. The system of claim 1, wherein (iii) comprises reflecting to the melt pool.

3. The system of claim 1, wherein (iii) comprises reflecting to a location near the melt pool.

4. The system of claim 1, wherein the spherical reflecting surface comprises a coating configured to reflect to the 3D printing platform.

5. The system of claim 4, wherein the coating comprises an annular coating.

6. The system of claim 4, wherein the energy is configured to heat the coating to a first temperature greater than a second temperature of materials near the coating, thereby thermophoretically pushing the materials away from the coating.

7. The system of claim 1, wherein the mirror comprises a spherical non-reflecting surface.

8. The system of claim 1, wherein the hole is configured to permit one or more materials to pass therethrough.

9. The system of claim 1, wherein the mirror comprises a plurality of mirror segments.

10. The system of claim 9, wherein the plurality of mirror segments comprise a plurality of curvatures.

11. The system of claim 9, wherein the plurality of mirror segments comprise a plurality of focal points.

12. The system of claim 1, further comprising an optically transparent plate located between the mirror and the melt pool.

13. The system of claim 1, wherein the energy source comprises an optical energy source.

14. The system of claim 13, wherein the optical energy source comprises a laser source.

* * * * *